United States Patent [19]
Johnson

[11] Patent Number: 6,157,679
[45] Date of Patent: *Dec. 5, 2000

[54] METHOD OF ADDING ENCRYPTION/ENCODING ELEMENT TO THE MODULATION/DEMODULATION PROCESS

[75] Inventor: Christopher L. Johnson, Chicago, Ill.

[73] Assignee: Motorola, Inc., Schaumburg, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/954,348

[22] Filed: Oct. 17, 1997

[51] Int. Cl.[7] .................................................. H04L 27/10
[52] U.S. Cl. .................... 375/281; 375/261; 375/298; 332/103
[58] Field of Search ......................... 375/261, 265, 375/281, 286, 298, 346, 316; 380/4, 6, 9, 28, 46, 48; 332/103; 370/208

[56] References Cited

U.S. PATENT DOCUMENTS

| | | | |
|---|---|---|---|
| 4,924,516 | 5/1990 | Bremer et al. ............................. | 380/46 |
| 5,381,449 | 1/1995 | Jasper et al. ............................. | 375/298 |
| 5,406,588 | 4/1995 | Birchler et al. ......................... | 375/346 |
| 5,621,762 | 4/1997 | Miller et al. ............................. | 375/298 |
| 5,790,514 | 8/1998 | Marchok et al. ........................ | 370/208 |
| 5,835,536 | 11/1998 | May et al. ............................... | 375/316 |
| 5,838,728 | 11/1998 | Alamouti et al. ....................... | 375/265 |

*Primary Examiner*—Stephen Chin
*Assistant Examiner*—Chieh M. Fan
*Attorney, Agent, or Firm*—George C. Pappas; Jeffrey K. Jacobs

[57] ABSTRACT

A method is provided of adding an encryption element to the QAM modulation/demodulation process. This is achieved by first forming a sequence of transmit QAM constellation symbols on the basis of the information signal to be modulated/demodulated, which signal is comprised by a corresponding sequence of transmit information values. Each QAM transmit constellation symbol is based on a fixed transmit constellation in a complex plane and is characterized by a real part and an imaginary part, each part including a sign, the sign consisting of plus or minus. On the basis of a fixed algorithm, during signal modulation, one or more of the transmit constellation symbols are altered by, for example, conjugating the sign value of either the real or imaginary parts thereof to form a disguised or encrypted set of symbols. During demodulation, a corresponding "undo" algorithm is employed by the receiver to undo the conjugation/encoding of altered QAM symbols, thus decrypting the signal to arrive at the original sequence of QAM constellation symbols.

20 Claims, 3 Drawing Sheets

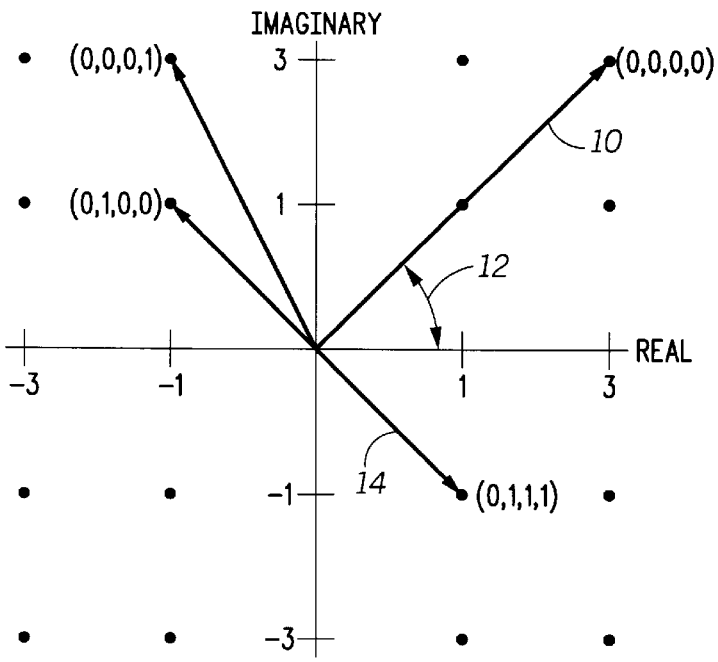
PRIOR ART  FIG. 1
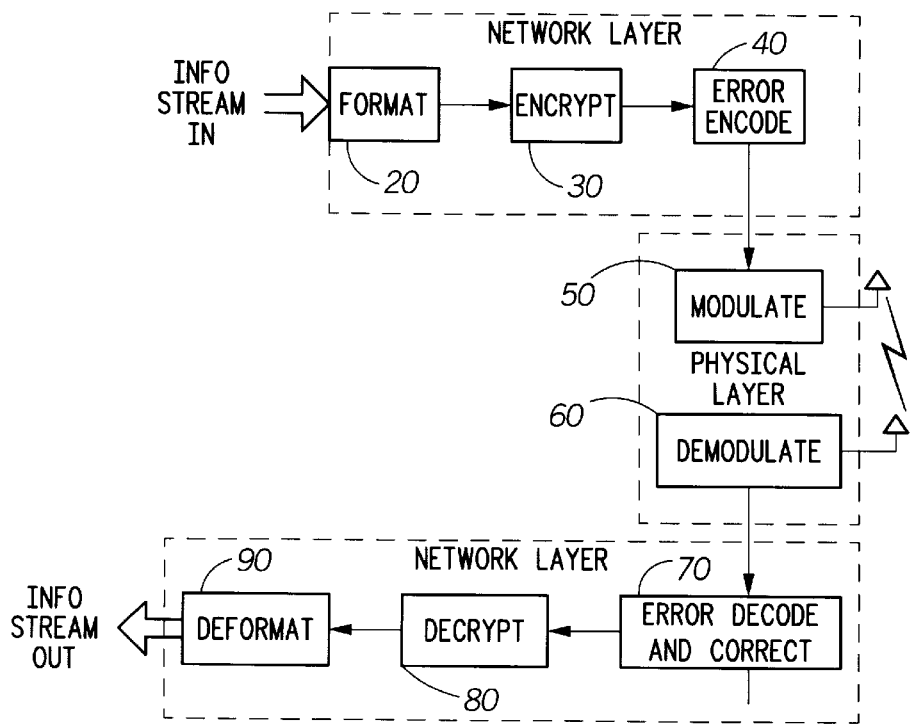
PRIOR ART  FIG. 2

METHOD OF ADDING ENCRYPTION/ENCODING ELEMENT TO THE MODULATION/DEMODULATION PROCESS

FIELD OF THE INVENTION

The present invention relates generally to radio communications systems, and more particularly to methods for the encryption and modulation of radio-frequency (RF) signals.

BACKGROUND OF THE INVENTION

Various communication systems are known in the art. Pursuant to many such systems, an information signal is modulated on to a carrier signal and transmitted from a first location to a second location. At the second location, the information signal is demodulated and recovered.

Typically, the communication path used by such a system has various limitations, such as bandwidth. As a result, there are upper practical limitations that restrict the quantity of information that can be supported by the communication path over a given period of time. Various modulation techniques have been proposed that effectively increase the information handling capacity of the communication path as measured against other modulation techniques. Sixteen-point quadrature amplitude modulation (QAM) provides a constellation of modulation values (distinguished from one another by each having a different combination of phase and amplitude) wherein each constellation point represents a plurality of information bits.

FIG. 1 shows a constellation for a 16 QAM communication system that is a map of 16 points on the complex plane defined by a horizontal axis representing the real portions, and a vertical axis representing imaginary portions, of a complex number. Transmitted QAM information symbols on a communication channel (and the pilot and sync symbols as well) are discrete packets of a carrier signal modulated to convey information using both the amplitude and phase-angle displacement of the carrier from some reference. QAM information symbols are represented on the constellation of FIG. 1 as complex quantities represented as vectors having both magnitude (represented as length or distance from origin) and phase angles (which angles are measured with respect to one of the axes). In a 16-QAM system, having sixteen (16) different magnitude and phase angle combinations that correspond to sixteen (16) different possible bit patterns of four binary digits (which bits are from a serial stream of bits from an information source), each of the sixteen (16) points on the constellation is identified as representing one combination of four bits.

A vector (10) (expressed in rectangular coordinates as 3+3j and having a length=$(3^2+3^2)^{1/2}$ and a phase angle (12) equal to the arctan of 3/3 or forty five degrees with respect to the real axis), points to the point {3,3j} on the constellation, which point is shown in FIG. 1 as representing the series of four binary digits, (0,0,0,0). A second QAM symbol (14) points to yet another point (1, −1j) in this constellation and represents four other digital symbols.

From the foregoing, it can be seen that eight bits of information can be represented by two, 16-QAM symbols. When a digital stream is directly converted to 16 QAM, four-bit blocks of the data are mapped to the various vectors that correspond to the bit pattern embodied in the four bits. When the QAM symbols that represent the digital information are transmitted, the symbols are transmitted with amplitudes and phase angles that correspond to the magnitudes and phase angles of the vectors used to represent the various patterns, such as those shown for the vectors 10 and 14 depicted in FIG. 1.

In addition to modulating the information signal in a typical manner described generally above, it might also be desirable to disguise (encrypt) the information signal prior to transmission, as well as to provide some form of error detection and/or correction. The drawbacks to doing so is that both encryption and error correction schemes generally add significant undesirable processing delay to the information transfer process, and particularly to voice transmitted information.

Regarding encryption, because the radio signals are sent over public space, there is always the possibility of someone capturing the signal and copying it for improper use. One approach is to avoid sending any critical, confidential or restricted information of the information stream or signal packet over the air. The preferred approach, however, is to apply some sort of encryption algorithm to the data portion of the information stream and then having the proper receivers possess a decryption key which would make possible extracting the true contents of the data from the encrypted packet.

Typically, encryption schemes are implemented (architecturally) as shown in flow diagram of FIG. 2. During information processing, the information stream (e.g., a voice signal, packet data, etc.) is formatted (20) into a form that can be handled in the wireless environment. Thereafter, if encryption is employed, the formatted output is encrypted or disguised (30) to provide the necessary protection for safely transmitting the formatted signal over the air. The next stage typically involves encoding (40) the encrypted signal (digital bit stream) to provide a means for identifying and correcting errors. Typically, errors in radio-frequency (RF) communication systems are usually associated with interference that modifies the data streams while they are in the transmission medium (typically air). Since errors can cause changes or dropping of information bits and thus invalidate the received packets, error correction is quite critical, particularly in non-voice or packet data information transfers.

Once the system network has progressed through each of the formatting, encryption and encoding stages of information stream processing, the network forwards the encoded information to the modem layer of processing where it is modulated (50) (using for example a 16-QAM modulation technique)—and then transmitted over the air.

On the receiver end, the received packet is demodulated (60), decoded (70), decrypted (80), and deformatted in to a form recognizable by the receiving party (voice) or apparatus (packet data). The decoding and decryption schemes provided at the network layer by the network are based on the corresponding encoding and encryption schemes employed by a similar layer in the network. Similarly, the demodulation scheme employed at the modem (or physical) layer of the receiver is based on the corresponding modem layer modulation scheme at the transmitter. Encryption (decryption) and encoding (decoding) are therefore higher level mechanisms and network dependent, while modulation (demodulation) is system independent and typically a mechanism residing in the modem layer of the information transfer process.

It would be a great advantage in the art to be able to introduce encryption functionality to the information transfer process, but to do so in a less intrusive manner such as outside the higher (network) layer of processing which adds significant undesirable processing delay to information transfer.

BRIEF DESCRIPTION OF THE DRAWINGS

FIG. 1 shows a constellation for a 16 QAM communication system in accordance with the prior art;

FIG. 2 is a flow chart showing an encryption scheme as implemented (architecturally) in the prior art;

DETAILED DESCRIPTION OF THE PREFERRED EMBODIMENTS

Generally, the present invention is directed to a method of adding an encryption element to the QAM modulation/demodulation process. This is achieved by first forming a sequence of transmit QAM constellation symbols on the basis of the information signal to be modulated/demodulated, which signal is comprised by a corresponding sequence of transmit information values. Each QAM transmit constellation symbol is based on a fixed transmit constellation in a complex plane and is characterized by a real part and an imaginary part, each part including a sign, the sign consisting of plus or minus. On the basis of a fixed algorithm, during signal modulation, one or more of the transmit constellation symbols are altered by, for example, conjugating the sign value of either the real or imaginary parts thereof to form a disguised or encrypted set of symbols. During demodulation, a corresponding "undo" algorithm is employed by the receiver to undo the conjugation or encoding of altered QAM symbols, thus decrypting the signal to arrive at the original sequence of QAM constellation symbols.

The present invention will now be described in greater detail with reference to FIGS. 3 and 4.

Figure 3:
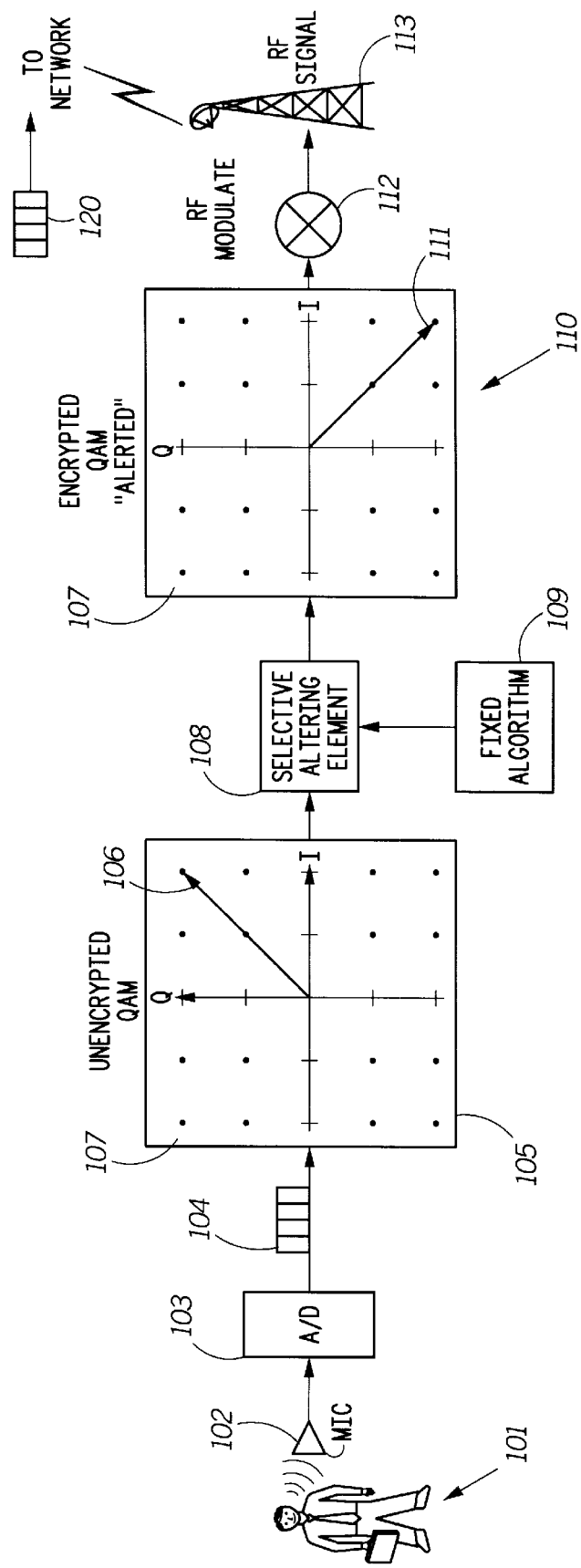
FIG. 3 shows a block diagram of a communication unit including circuitry for adding an encryption element as part of the modulation process of a signal to be transmitted over a wireless network, in accordance with the present invention.
Figure 4:
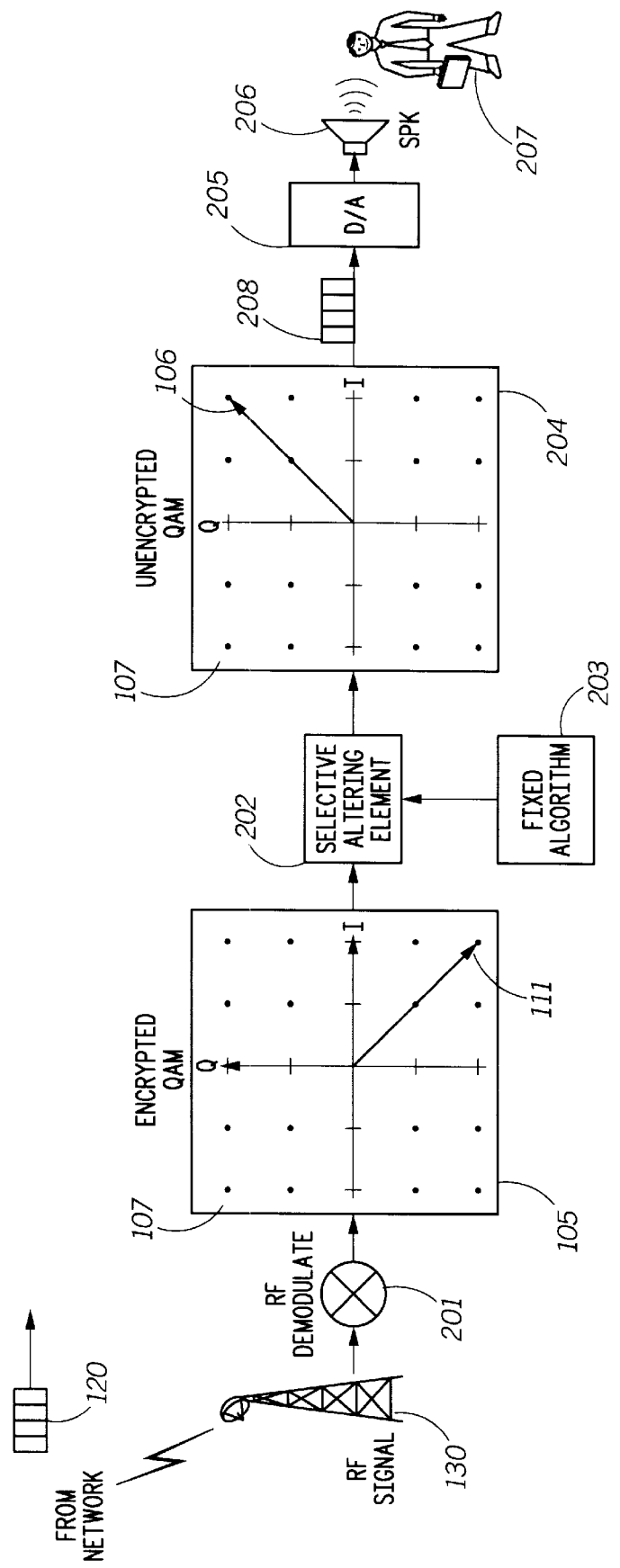
FIG. 4 shows a block diagram of a communication unit including circuitry for removing the encryption element from the signal received from the communication unit described in FIG. 3, in accordance with the present invention.

FIG. 3 is a block diagram showing the signal processing and modulation circuitry 100 in a calling subscriber unit (not shown), such as a cellular phone or mobile radio, in accordance with the present invention. In the exemplary embodiment, a caller 101 is shown sending voice signals over a wireless radio communication system network. The caller's voice signals are detected by the signal processing and modulation circuitry 100, processed and transmitted wirelessly over the network. The circuitry 100 comprises a microphone 102 that picks up the voice signals, feeds them to an analog-to-digital converter 103, which converts the voice signals to a digital sequence of transmit information values 104. The digital sequence 104 is then input to a 16-QAM constellation symbol generator 105, which generates, in a known manner, a corresponding sequence of transmit constellation symbols 106.

As is known in the art, each symbol 106 is based on a fixed constellation mapped to a complex plane 107. As each symbol 106 is output, it is fed to a selective altering element 108. On the basis of a fixed algorithm 109, the selective altering element 108 alters each symbol 106 (or every nth symbol in the sequence of symbols) received from the QAM constellation symbol generator 105 to form a new sequence of altered QAM constellation symbols. In the preferred embodiment, alteration may involve a simple exercise of conjugating an input symbol. Conjugation simply means flipping the sign of the j component (or the i component) of a symbol as shown by the j component conjugation of the QAM symbol 106 to form a corresponding altered symbol as represented by the altered QAM symbol 1 11 in the exemplary constellation 110 shown in FIG. 3.

The sequence of altered constellation symbols 110 are subsequently modulated in a conventional manner by an RF modulation circuit 112 and transmitted over the air (or the like wireless media) to an RF site 113. The RF site 113 receives the modulated symbols together with any necessary non-information (non-voice) bearing modulated symbols and passes them as a signal (120) over the network (not shown) to the RF site 130 where the receiving subscriber unit resides.

The receiving subscriber unit (not shown), in turn, includes demodulation processing circuitry 200 (shown in block diagram form in FIG. 4) comprised of an RF demodulation circuit 201, a selective altering element 202 responsive to a conjugation "undo" algorithm 203, a QAM symbol-to-information value generator 204, a digital-to-analog converter 205 and a speaker 206 through which are broadcast the voice signals of caller 101 to a listener 207. The selective altering element 202 receives the demodulated encrypted constellation symbols generated by the selective altering element 108 in the caller subscriber unit, and decodes them to generate the original sequence of QAM transmit constellation symbols corresponding to the sequence of voice-information bearing transmit values 104 generated by the analog-to digital converter 103 in FIG. 3. If any falsely transmitted signals transmitted to the listener subscriber unit were combined into the message 120 by accident, such signals once decoded would create undesirable audio artifacts, as will be explained in greater detail below in connection with frequency reuse conditions.

The present invention contemplates that the encryption element described herein may be dynamically or randomly established by either the network (not shown), or by the encryption/encoding algorithm 109, by way of a pseudo-random bit sequence and communicated in some disguised manner to the receiving subscriber unit so as to allow it to undo the encryption/encoding upon receipt of the transmitted signal. Without knowledge of the conjugation/encoding sequence, the true information bearing symbols 111 could not be decoded (extracted) in real-time, or if they are, they would result in undesirable audio.

The encryption element as proposed herein does not in any way alter the spectral content of the transmitted voice signals. The conjugation/encoding is merely an encoding process introduced into the information bearing symbol stream to provide an element of added security, and thus privacy, to the communication session between subscribers or the like communication units.

Furthermore, the additional processing capacity required of the subscriber units to perform their respective modulation (demodulation) encrypting (decrypting) of voice signals is negligible. A conjugation, for example, is a simple operation involving only a sign change (no computation) and can be implemented easily without consuming significant process.

It should be appreciated that the subscribers can be programmed with variable or non-fixed conjugation or the like encoding codes. It has been suggested above that a pseudo-random bit sequence can be used to select the conjugation/encoding criteria for a given call. However, it might be preferable under certain situations if the conjugation/encoding parameters are predetermined (i.e., fixed). For example, a given subscriber unit may be assigned a unique conjugation/encoding code so as to restrict communications to/from that unit to only those privy to the same code. The code(s) may also be listener dependent, or talkgroup dependent. In this regard, it is contemplated that the network could provide the encryption element to the transmitted modulated sequence of symbols such that (while anyone in a talkgroup can transmit over the network), only those privy to the network conjugation/encoding code can listen to the talkgroup transmission. Alternatively, the conjugation/encoding code(s) may be embedded in a smartcard or the like attachable to the subscriber unit such that only those authorized to receive calls from the particular caller (versus the particular subscriber unit) could participate in a call.

The exemplary embodiment has been described in connection with the transmission and encryption of modulated voice signals. In addition, in the exemplary embodiment, the sequence of transmit information values 104, from which are derived 16-QAM constellation symbols 106, are 4-bit words. However, it should be appreciated that non-voice (data packets) would work equally well and that the encryption element applies equally well to different length bit words and to different types of constellation configurations.

The present invention inherently makes possible the muting, by the receiving unit, of undesirable audio artifacts introduced into the received audio stream, as may occur in a frequency reuse system layout. Communication systems that geographically reuse communication resources are known in the art. Characteristically, these systems allocate a predetermined set of communication resources in one geographic area and reuse the same set of communication resources in one or more geographic areas.

Two of the most common communication systems which geographically reuse communication resources are cellular and trunked mobile communication systems. In both communication systems, allocation of a communication resource begins when a subscriber or like communication unit requests communication service. Based on resource availability and signal usability, a resource controller assigns the communication resource, such as frequency channel or a time slot, to the communication unit. Based on the subscriber unit's present position in a frequency reuse system layout, it is sometimes the case that the subscriber unit might falsely detect an "interfering" or "undesirable" transmission for a portion of the original transmission. This very typically produces undesirable audio artifacts.

The encryption element proposed herein would further make it possible for the receiving subscriber unit to better detect a fading situation, as may occur when a set of transmitted symbols includes portions from two different resources (sites) in a frequency reuse environment. For example, assuming a data word comprised of x number of symbols, y of which are received from a first (correct) transmitter, and x-y from a second incorrect transmitter broadcasting on the same channel (or slot), and assuming that each of the symbols x are encrypted by the associated conjugation algorithm corresponding to that transmitter, then if the receiving subscriber unit is keyed to decrypt the modulated signal using the undo algorithm corresponding to the conjugation algorithm associated with the first (correct) transmitter, then the information (symbols, x-y) received in error could be more readily identified. The result and obvious benefit is that the undesirable audio artifacts can be muted.

It should be appreciated that the use of this invention is not limited to voice applications, but is equally applicable for data applications like fax (circuit data) or internet access (packet data). In addition, while an exemplary embodiment has been described employing 16 QAM sizes, any constellation size may be used, including 64 QAM, 256 QAM, and QPSK, all well known in the art.

It is contemplated by the present invention that the receiving subscriber unit will possess the functionality to detect a wrong constellation symbol in the sequence of received decoded symbols. Such functionality is well known in the art and a critical basis for employing constellation properties in the first instance.

It should be noted that any number of alternative encryption conjugation sequences are available for any given constellation size. Of course, it should be appreciated that the present invention describes only a mechanism for encryption, and is not intended as a substitute to an overall, more secure, higher level encryption scheme.

While the present invention has been particularly shown and described with reference to particular embodiments thereof, it will be understood by those skilled in the art that various changes in form and details may be made therein without departing from the spirit and scope of the present invention.

I claim:

1. In a communication unit, a method of modulating a signal comprised of a sequence of transmit information values comprising the steps of:

based on the sequence of transmit information values, forming a corresponding sequence of transmit constellation symbols, each transmit constellation symbol being based on a fixed transmit constellation in a complex plane and including a real part and an imaginary part, each part including a sign, the sign consisting of plus or minus; and selectively conjugating, on the basis of a fixed algorithm that employs a bit sequence selected from the group consisting of a pseudo-random bit sequence and a predetermined bit sequence, one or more transmit constellation symbols of the sequence of transmit constellation symbols to form a sequence of altered transmit constellation symbols.

2. The method of claim 1, further comprising the step of transmitting, over a radio-frequency (RF) medium, the selectively altered transmit constellation symbols.

3. The method of claim 1, wherein the sequence of transmit information values comprise 4-bit words.

4. The method of claim 1, wherein the fixed transmit constellation is one of a 16 QAM, 64 QAM, 256 QAM, and QPSK constellation.

5. The method of claim 1, wherein the communication unit is a portable unit and the transmit information values represent one of voice signals, circuit data signals, and packet data signals.

6. The method of claim 1, wherein the fixed algorithm comprises conjugating every $n^{th}$ transit constellation symbol of the sequence of transmit constellation symbols.

7. The method of claim 6, wherein said step of conjugating every $n^{th}$ transit constellation symbol of the sequence of transmit constellation symbols includes changing the corresponding true sign of at least one of either the real part or the imaginary part, by reversing the sign thereof.

8. The method of claim 7, wherein the sequence of transmit information values comprise 4-bit words.

9. The method of claim 8, wherein the fixed transmit constellation is one of a 16 QAM, 64 QAM, 256 QAM, and QPSK constellation.

10. The method of claim 9, wherein the communication unit is a portable unit and the transmit information values represent one of voice signals, circuit data signals, and packet data signals.

11. In a communication unit, a method of demodulating a signal comprised of a corresponding sequence of altered constellation symbols corresponding to a sequence of receive information values, comprising the steps of:

selectively conjugating, on the basis of a fixed algorithm that employs a bit sequence selected from the group consisting of a pseudo-random bit sequence and a predetermined bit sequence, one or more of said altered constellation symbols to form a corresponding sequence of true receive constellation symbols, each of said altered and true receive constellation symbols being based on a fixed constellation in a complex plane and including a real part and an imaginary part, each part including a sign, the sign consisting of plus or minus; and converting said corresponding sequence of true receive constellation symbols to extract a corresponding sequence of receive information values.

12. The method of claim 11, further comprising the step of receiving, over a radio-frequency (RF) medium, the altered constellation symbols.

13. The method of claim 11, wherein the corresponding sequence of receive information values comprise 4-bit words.

14. The method of claim 11, wherein the fixed constellation is one of a 16 QAM, 64 QAM, 256 QAM, and QPSK constellation.

15. The method of claim 11, wherein the communication unit is a portable unit and the sequence of receive information values represent one of voice signals, circuit data signals, and packet data signals.

16. The method of claim 11, wherein the fixed algorithm comprises conjugating every $n^{th}$ altered constellation symbol of the sequence of altered constellation symbols.

17. The method of claim 16, wherein said step of conjugating every $n^{th}$ altered constellation symbol of the sequence of altered constellation symbols includes changing the corresponding sign of at least one of either the real part or the imaginary part, by reversing the sign thereof.

18. The method of claim 17, wherein the corresponding sequence of receive information values comprise 4-bit words.

19. The method of claim 18, wherein the fixed constellation is one of a 16 QAM, 64 QAM, 256 QAM, and QPSK constellation.

20. The method of claim 19, wherein the communication unit is a portable unit and the sequence of receive information values represent one of voice signals, circuit data signals, and packet data signals.

* * * * *